United States Patent Office 3,467,642
Patented Sept. 16, 1969

3,467,642
METHOD FOR MAKING CHROMOGEN-BONDED-FLUORESCENT-BONDED-POLYMERS
Shojiro Horiguchi, 965 Shimohoya, Hoyamachi, Kitatama-gun, Tokyo, Japan, and Michiei Nakamura, 156, 5-chome, Motobuto-cho, Saitama-ken, Urawashi, Japan
No Drawing. Filed Dec. 28, 1965, Ser. No. 517,080
Claims priority, application Japan, Dec. 29, 1964, 39/74,160
Int. Cl. C07c *113/04;* C08f *15/42;* C09b *57/00*
U.S. Cl. 260—141          7 Claims

ABSTRACT OF THE DISCLOSURE

A mixture is made of a diazonium salt of a chromogen such as either a dye, a pigment, or an intermediate of a dye or pigment, and a diazonium salt of a fluorescent compound such as a fluorescent dye, a pigment or an intermediate of a fluorescent dye or pigment and one or more species of addition polymerizable monomers. The monomers are polymerized using both the diazonium salt of the chromogen and the diazonium salt of the fluorescent compound as initiators for the polymerization to form the chromogen-bonded-polymer.

---

This invention relates to a chromogen-bonded-fluorescent compound-bonded-polymer and a process for the production thereof.

It is well known that conventional dyes which are normally utilized in the dyeing industry and which are bright in color are characterized by weak resistance to light, heat, chemicals, migration, solvents, etc. Pigments have characteristics superior to dyes with respect to resistance to degrading phenomena such as the aforesaid light, heat, chemicals, etc. However, pigments present the disadvantages in their use in that the brightness of their color and their transparency is much inferior to that of conventional dyes both in the cases of a single color or of a combination of colors. Consequently, when pigment is utilized as a coloring agent, since its particles are larger than dye particles, the pigment has to be repeatedly kneaded with solvents, varnishes, plasticizers, plastics and like materials in diverse dispersing apparatus to produce smaller particles therefrom.

However, pigment powder during its production process, tends to aggregate and flocculate when it undergoes the pressure filtering step in such process and then tends to further aggregate when it is dried, to form very hard clusters. Such clusters, once formed, can no longer ever be dispersed satisfactorily completely no matter what mechanical energy or means are utilized to effect their dispersion. Consequently, since, of necessity, pigment particles in dispersion are much larger than those of dyes, not only are pigments comparatively opaque, as compared to the transparency of dyes, but the brightness of their color is much inferior to that of dyes. Furthermore, large particles result in the lowering of abrasion resistance in the case of coatings and in the degradation of mechanical properties in the case of mixed-coloring i.e., inner coloring and thereby deleteriously affect the colored material by causing aging, degradation, excoriation and delamination.

In coloring with conventional water-soluble coloring materials such as known reactive dyes, the chromogens in these dyes are generally chosen to have a functional radical which is believed to covalently bond with a functional radical of the material, such as a fibrous substance, to be bonded, to color the material. In this situation, a reactive dye which has been hydrolyzed with the water medium or a reactive dye which has lost its functional radicals through reaction with a sizing material, for example, will no longer be able to react with the material to be colored, thereby reducing fastness of color. Furthermore, conventional dyes having a radical such as a sulfo or carboxyl radical in their chromogen, if not sufficiently applied to a fabric material, for example, will again dissolve or be dispersed in water when the dyed materials are washed and will stain white and light colored portions of the material. Even where sufficient dye has been applied, variations in pH or other conditions may result in a varying of the hue.

In order to overcome these disadvantages, the inventors herein have proposed a process for producing a colored polymer, more particularly, a chromogen-bonded-polymer which comprises mixing an addition-polymerizable monomer with a diazonium salt of a pigment, a diazonium salt of a dye or a diazonium salt of an intermediate of a pigment or dye and polymerizing such monomer to form the chromogen-bonded-polymer.

The chromogen-bonded-polymer produced in the above process is a chemical compound in which the chromogen portion is directly and chemically bonded to the polymer portion. Such chromogen-bonded-polymer is an excellent coloring agent which has a brightness and a transparency of color comparable to those of conventional dyes, a fixing strength comparable to that of a high polymer binder, good retention of desired mechanical and electrical properties and superior resistance to degrading phenomena such as chemicals, migration, where the chromogen portion is of the pigment type, the chromogen-bonded-polymer also exhibits superior resistance to light and heat.

It is known to employ fluorescent compounds such as fluorescent dyes or pigments in order to provide fluorescence in materials. Such employment, however presents the disadvantage that the light resistance of the imparted fluorescence is very weak and such disadvantage is merely improved by the addition of an antioxidant and the like. In other words, a fluorescent dye for example is advantageously employed because it is readily soluble in water, but the products colored thereby have no permanence of fluorescent effect. Thus, for example, when a fluorescent dye is used for dyeing of cloth, it is occasionally quite simply washed away by a water washing of the dyed cloth. The use of a fluorescent pigment presents the disadvantage in that such pigment is quite easily soluble in most organic solvents and does not require the selection of a particular solvent.

It has been known to use the fluorescent products obtained by mixing fluorescent compounds with urea resins and like materials. The particles of such fluorescent products are highly crosslinked thermosetting resins, and, thus, their dispersibility is not good. When these fluorescent products are used, a highly dispersing procedure is therefore necessary which is quite inconvenient.

Since chromogen-bonded-polymers, as mentioned hereinabove, have been proven to have such desirable characteristics and advantageous properties when used as coloring materials, it is believed that chromogen-bonded-fluorescent compound-bonded-polymers should have commensurately desirably advantageous properties as coloring materials which impart a fluorescent effect to the articles and materials colored thereby and to not possess any of the disadvantages exhibited by known fluorescent dyes, pigments, and intermediates of the dyes and pigments.

Accordingly, it is an important object of this invention to provide a process for preparing chromogen-bonded-fluorescent compound-bonded-polymers.

It is another object to provide the chromogen-bonded-fluorescent compound-bonded-polymers produced by the process in accordance with the preceding object.

It is a further object to provide a process for coloring articles with the chromogen-bonded-fluorescent compound-bonded-polymers of the invention.

These objects are achieved by providing a process in which a mixture is made of either a diazonium salt of a dye, or a diazonium salt of a pigment or a diazonium salt of an intermediate of a dye or a pigment, and a diazonium salt of a fluorescent dye or a diazonium salt of a fluorescent pigment, or a diazonium salt of a intermediate of a fluorescent dye or a pigment. In such mixture there are included one or more species of addition-polymerizable monomers. The monomers are polymerized using both the diazonium salt of the chromogen and the diazonium salt of the fluorescent compound as initiators for the polymerization of the monomers to form the chromogen-bonded-polymer. With this process, the polymer portion of the chromogen-bonded-fluorescent compound-bonded-polymer is chemically bonded to both the chromogen portion and the fluorescent compound portion.

The chromogen-bonded-fluorescent compound-bonded-polymer thus obtained can be molded or spun to provide molded articles, film, filament and the like having fluorescence. Furthermore, the chromogen-bonded-fluorescent compound-bonded-polymer can also be used for imparting a fluorescent color to fibers, fabrics, and other materials e.g., paper, yarn, fabric, nonwoven fabric and the like, leather, metal plate, metal foil, glass, synthetic film, molded article, soaps, snythetic detergents, cosmetics etc. by printing or coating on them or by mixing the chromogen-bonded-fluorescent compound-bonded-polymer therewith.

According to the process of the invention, since the chromogen portion and fluorescent compound portion are directly bonded to the polymer portion, the chromogen-bonded-fluorescent compound-bonded-polymer can provide a color shade such as that of a pigment or a dye and simultaneously can impart fluorescence to a material to be treated, and, therefore, has many useful applications.

Since the chromogen portion and the fluorescent compound portion are directly chemically bonded to polymer portion, the chromogen portion and the fluorescent compound portion can not be separated from the polymer portion through physical separation.

The chromogen-bonded-fluorescent compound-bonded-polymer may be amorphous, i.e. as judged from its X-ray diffraction pattern, it is free of any crystal form. It can also not be separated by means of a fractional separation, and no crystallization occurs upon its melting or upon its heating in a solvent.

The chromogen-bonded-fluorescent compound-bonded-polymer exhibits a dispersibility in ultra fine particle form equal to that of a conventional dye by virtue of the dispersibility of the polymer portions being bonded to both the chromogen portion and the fluorescent compound portion, and has a bright and attractive color shade. It, therefore, has the advantage of not becoming a dull shade even in the case of a combination of two or more chromogen-bonded-fluorescent compound-bonded-polymers. Furthermore, where a pigment type chromogen constitutes the chromogen portion, its light fastness is very high. The operation of the chromegen-bonded-fluorescent compound-bonded-polymer in its many applications is readily achieved.

In the production of the chromogen-bonded-fluorescent compound-bonded-polymers by the process according to the invention, furthermore, chromogen-bonded-fluorescent compound-bonded-polymers which are soluble in particular solvents but insoluble or, at most, only slightly soluble in other patricular solvents can be obtained by a suitable selection of the kind and quantity of addition-polymerizable monomers to be polymerized and consequently, a suitable selection for a particular solvent can be accomplished.

When the polymerization is carried out with the employment of addition-polymerizable monomers having reactive radicals, a polymer portion which is bonded to the chromogen and fluorescent compound portions correspondingly has reactive-radicals. Therefore, these reactive radicals can be interreacted together or reacted with reactive radicals of a material to be fluorescent colored. Examples of such latter reactive radicals being reactive radicals of fabrics. The reactive radicals on the polymer portion can be reacted with reactive radicals of reactive compounds such as crosslinking agents, precondensates of thermosetting resins, reactive latex, crosslinkable high molecular compounds to be strongly fixed upon the materials to be fluorescent colored. As a result, the chromogen-bonded-fluorescent compound-bonded-polymer can not be washed away. Its fixing ratio is very high and its fastness is excellent.

Polymerization can be carried out by mixing one or more types of monomers without any regard to the proportional quantity of each type of monomer. The properities of the polymer portion in the chromogen-bonded-fluorescent compound-bonded-polymer are derived from those of the monomers of many various types, such as, for example, reactive functional, weakly-reactive, or non-reactive. In addition, the polymer portion will be water or oil-dispersible, depending upon the proportional quantity of each type of monomer in the monomer mixture to be polymerized. The polymerization can be carried out by any of the known methods of addition-polymerization such as, solution-, block-, emulsion-, and suspension-polymerizations.

The addition-polymerizable monomers which may be used in the process according to the invention, may be largely divided into three groups according to the reactivity of the radicals thereof. The use of any generally known polymerization initiator will not interfere with the attainment of the inventive polymer.

The term "fluorescent compounds" as used herein is meant to signify fluorescent dyes, fluorescent pigments, and intermediates of such dyes and pigments.

As the fluorescent compound components of the diazonium salts of the fluorescent compounds which may be used in the process according to the invention, there may be employed compounds derived from diaminostilbene, diaminostilbene disulfonic acid, distyryl benzene, thiazole, oxazole, triazole, carbazole, imidazole, imidazolone, coumarin, pyridine, benzidine, carbostyril, pyrazoline, naphthalimide, aldazine, anilino anthracene, oxacyanine, pyrimidanthrone, triphenylmethane, polycyclic quinone. In addition, there may be used the above mentioned fluorescent compounds which may or may not have a chromophore and/or auxochrome group.

The diazonium salts of chromogens which may be used in the process according to the invention are prepared by diazotizing chromogen containing amino compounds. By the term "chromogen," there is meant pigments, dyes, and intermediates of pigments and dyes.

As the diazonium salts of the pigments which may be used in the process according to the invention, there may be included the diazonium salts of such various well known pigments as phthalocyanine pigments, anthraquinone pigments, perionone pigments, perylene pigments, flavanthrone pigments, pyrimidine pigments, indanthrone pigments, dioxazine pigments, quinacridone pigments, indigo pigments, thioindigo pigments, the azo pigment series such as azo coupling pigments and azo condensation pigments, basic lake pigments, and the like.

As the diazonium salts of dyes, which may be used in the process according to the invention, there may be utilized the diazonium salts of such various well known dyes as chromogens containing the sulfo radical or carboxyl radical on the above-mentioned pigment-type chromogens.

As the diazonium salts of intermediates of pigments which may be used in the process according to the invention, there may be employed the diazonium salts of such intermediates of various well known pigments as the intermediates of the above-mentioned pigment-type chromogens.

As the diazonium salts of intermediates of dyes which may be used in the process according to the invention, there may be employed the diazonium salts of such intermediates of various well known dyes as intermediates of the above-mentioned dye-type chromogens.

Typical diazonium salts of such utilizable chromogens may be copper phthalocyanine tetra-diazonium salt, copper phthalocyanine tri-diazonium salt, monochloro copper phthalocyanine tri-diazonium salt, cobalt phthalocyanine tri-diazonium salt, nickel phthalocyanine tri-diazonium salt, anthrapyrimidine tetrazonium salt, flavanthrone tri-diazonium salt, di-bromoanthrone tetrazonium salt, pyranthrone tri-diazonium salt, perylene vermilion tetrazonium salt, perylene scarlet diazonium salt, phthaloperinone tearazonium salt, acridone red diazonium salt, oxazole red tri-diazonium salt, isoviolanthrone tri-diazonium salt, quinacridone tetrazonium salt, dichloro quinacridone tetrazonium salt, carbazole dioxazine tri-diazonium salt, Vat Orange GR tetrazonium salt, indanthrone tri-diazonium salt, 2.6-bis-[4-(diazonium salt)-anthraquinonyl-(1-amino]-4-[p-(diazonium salt)-phenoxy]-s-triazine,
2.4.6-tris[4-(diazonium salt)-anthraquinonyl-(1)-amino]-s-triazine,
2.4.6-tris-{4-[p-(diazonium salt)-benzamido]-anthraquinonyl-(1)amino}-s-triazine,
2.4.6-tris-{5-[p-diazonium salt)-benzamido]-anthraquinonyl-(1)-amino}-s-triazine,
indigo tetrazonium salt,
dichlorothioindigo tetrazonium salt,
tetramethyl dichlorothioindigo tetrazonium salt,
7.7'-dimethyl-4.4'-dichloro thioindigo-5.5'-tetrazonium salt,
7.7'-dimethyl-5.5'-dichlorothioindigo-4.4'-tetrazonium salt,
7.6'-dichloro-4'.7'-dimethyl thioindigo-5.5'-tetrazonium salt,
3.5-dichloro-4-(diazonium salt)-benzene-azo-β-naphthol,
3.5-dichloro-4-(diazonium salt)-benzene-azo-2-hydroxy-3-naphthoic-4'-(diazonium salt)-anilide,
2-methoxy-5-benzoylamino benzene-azo-2-hydroxy-3-naphthoic-4'-(diazonium salt)-anilide,
3.5-dichloro-4-(diazonium salt)-benzene-azo-2-hydroxy-3-naphthoic-3'-(diazonium salt)-anilide,
3-trifluoromethyl-4-chlorobenzene-azo-2-hydroxy-3-naphthoic-3'-(diazonium salt)-anilide,
3.3'-dimethoxydiphenyl-disazo-bis-4-(diazonium salt)-naphthalene,
diphenyl-disazo-bis-3'-(diazonium salt)-acetoacetic anilide,
bis-[3.5-dichloro-4-(diazonium salt)-benzene-azo-acetoacetic-o-toluidide],
bis-[3.5-dichloro-4-(diazonium salt)-benzene-azo-2-hydroxy-3-naphthoic-o-chloro anilide]

and the like. In addition there may be employed compounds containing a sulfo or carboxyl radical in the above mentioned diazonium salts of the compounds, such as sulfonated copper phthalocyanine tri-diazonium salt,
sulfonated flavanthrone tetrazonium salt,
sulfonated phthaloperinone tetrazonium salt,
2.4.6-tris-[4-(diazonium salt)-8-sulfo-anthraquinonyl-(1)-amino]-s-triazine,
disulfonated carbazole dioxazine tetrazonium salt,
3.5-dichloro-4-(diazonium salt)-benzene-azo-1-hydroxy-6-(diazonium salt)naphthalene-3-sulfonic acid,
m-(diazonium salt)-benzene-azo-2-naphthal-6.8-disulfonic acid,
4-(3.5-dichloro-4-(diazonium salt)-benzene-azo)-1-(p-sulfophenyl)-3-methyl-5-hydroxy-pyrazole,
3.3'-dimethoxydiphenyl-disazo-bis-1-naphthol-7-(diazonium salt)-3-sulfonic acid and the like.

The above-mentioned diazonium salts of intermediates of pigment or dyes are diazonium salts of intermediates of both types of the above-mentioned diazonium salts, such other types being typified by those such as 2-hydroxynaphthoic-(3'-diazonium salt)-anilide,
2-hydroxynaphthoic-(4'-diazonium salt)-anilide,
2-hydroxynaphthoic-(5'-diazonium salt)-o-toluidide,
2-hydroxynaphthoic-(4'-diazonium salt)-o-toluidide,
1-[m-(diazonium salt)-phenyl]-3-methyl-5-pyrazolone,
1-[p-(diazonium salt)-phenyl]-3-methyl-5-pyrazolone,
acetoacetic-(3'-diazonium salt)-anilide,
acetoacetic-(4'-diazonium salt)-anilide,
5-(diazonium salt)-naphthol,
7-(diazonium salt)-naphthol-2 and the like, and 3-sulfo-6-(diazonium salt)-naphthol-1,
3-sulfo-7-(diazonium salt)-naphthol-1,
3.6-di-sulfo-8-(diazonium salt)-naphthol-1,
3.5-disulfo-8-(diazonium salt)-naphthol-1 and the like.

The addition-polymerizable monomers which may be used in the process of the present invention are selected from the group classified as follows:

A first sub-group consisting of a first division consisting of addition-polymerizable monomers which, when polymerized, form a polymer containing in its structure reactive functional radicals capable of crosslinking to form a higher polymer and capable of crosslinking with a functional radical, and a second division consisting of addition-polymerizable monomers which, when polymerized, form a polymer containing in its structure reactive radicals capable of linking with a functional radical but incapable of crosslinking with itself, and a second sub-group consisting of addition-polymerizable monomers which are difficultly activated with reactive functional radicals.

The addition-polymerizable monomers belonging to the first division of the aforesaid sub-group are addition-polymerizable monomer containing in their structures reactive functional radicals such as the N-methylol amide radical, the N-alkylmethylol amide radical, the epoxy radical, the chlorohydrin radical, the ethyleneimine radical, the acid chloride radical, the isocyanate forming radical and the like.

Examples of the addition-polymerizable monomers belonging to the aforesaid first division of the first sub-group are acrylic chloride, methacrylic chloride, crotonic chloride, itaconic chloride, maleic chloride, fumaric chloride, N-methylol acrylamide, N-methylol methacrylamide, N-methylol crotonic amide, N-methylol itaconic monoamide, N.N'-dimethylol itaconic diamide, N-methylol maleic monoamide, N.N'-dimethylol maleic diamide, N-methylol fumaric monoamide, N.N'-dimethylol fumaric diamide, N-mono-, di-, tri- and tetra-methylol diamino vinyl triazine, N-mono-, di- and tri-methylol vinyl urea, N-alkylmethylol acrylamide, N-alkylmethylol methacrylamide, N-alkylmethylol crotonic amide, N-alkylmethylol itaconic monoamide, N.N'-dialkylmethylol itaconic diamide, N-alkylmethylol maleic monoamide, N.N'-dialkylmethylol maleic diamide, N-alkylmethylol fumaric monoamide, N.N'-dialkylmethylol fumaric diamide, N-mono-, di-, tri- and tetra-alkylmethylol diamino vinyl triazine, N-mono-, di- and tri-alkylmethylol vinyl urea, glycidylacrylate, glycidyl methacrylate, glycidyl crotonate, monoglycidyl itaconate, diglycidyl itaconate, allyl glycidyl ether, γ-chloro-β-hydroxy-n-propyl acrylate, γ-chloro-β-hydroxyn-propyl methacrylate, mono-(γ - chloro - β - hydroxy-n propyl) - itaconate, di - (γ - chloro - β - hydroxy - n-propyl)itaconate and allyl γ-chloro-β-hydroxy-n-propyl ether and the like.

The addition-polymerizable monomers belonging to the second division of the first sub-group are addition-polymerizable monomers containing in their structures reactive radicals which are selected from the group consisting of the carbonyl radical the hydroxyl radical the carboamide radical, the sulfoamide radical, the urea radical, the amino triazine radical, the amino radical, the imino radical and the like.

Examples of addition-polymerizable monomers belonging to the second division of the first sub-group are acrylic acid, methacrylic acid, crotonic acid, itaconic monoacid, itaconic diacid, maleic monoacid, maleic diacid, fumaric monoacid, fumaric diacid, acrylamide, methacrylamide, crotonic amide, itaconic monoamide, itaconic diamide, maleic monoamide, maleic diamide, fumaric monoamide, fumaric diamide, diamino vinyl triazine, vinyl urea, 2-hydroxyethyl acrylate, 2-hydroxyethyl methacrylate and the like.

Examples of addition-polymerizable monomers belonging to the second sub-group are methyl acrylate, ethyl acrylate, propyl acrylate, butyl acrylate, amyl acrylate, hexyl acrylate, octyl acrylate, lauryl acrylate, stearyl acrylate, methyl methacrylate, ethyl methacrylate, propyl methacrylate, butyl methacrylate, amyl methacrylate, hexyl methacrylate, octyl methacrylate, lauryl methacrylate, stearyl methacrylate, methyl crotonate, ethyl crotonate, butyl crotonate, methyl itaconate, ethyl itaconate, propyl itaconate, butyl itaconate, amyl itaconate, hexyl itaconate, octyl itaconate, lauryl itaconate, methyl maleate, ethyl maleate, propyl maleate, butyl maleate, methyl fumarate, ethyl fumarate, propyl fumarate, butyl fumarate, acrylonitrile, methacrylonitrile, vinyl acetate, vinyl propionate, vinyl chloride, vinylidene chloride, styrene, methyl vinyl ketone, methyl vinyl ether, vinyl pyrrolidone, vinyl pyridine, 2-vinyl-5-methyl pyridine, N.N-dimethylaminoethyl acrylate, N.N-diethylaminoethyl acrylate, N.N-dimethylaminoethyl methacrylate, N.N-diethylaminoethyl methacrylate, butadiene, isoprene, chloroprene and the like.

The chromogen-bonded-fluorescent compound-bonded-polymer produced with the use of the addition-polymerizable monomers belonging to the above first sub-group can be reacted with a compound which, when reacted with the polymer provides said functional reactive radicals for the polymer to produce the chromogen-bonded-fluorescent compound-bonded-polymer having the reactive functional radicals in its structure.

Such compounds are, for example formaldehyde, di-, tri- and tetra-methylol urea, di-, tri-, tetra-, penta- and hexamethylol melamine, di-, tri-, tetra-, penta- and hexaalkylmethylol melamine, epichlorohydrin, dichlorohydrin, ethyleneimine and the like.

The chromogen-bonded-fluorescent compound-bonded polymers produced with the use of the addition-polymerizable monomers having reactive and/or hydrolyzable radicals in their structures, such radicals being selected from the group consisting of the N-methylol amide, epoxy, chlorohydrin, ethyleneimine, acid chloride, acid anhydride, isocyanate forming radicals, carboxyl, hydroxyl, carboamide, sulfoamide, amino, imino, nitrile, ester, carboimide radicals and the like belonging to all of the above mentioned groups can be reacted with a compound which, when reacted with the polymer, provides the solubilizable radicals for the polymer to produce the chromogen-bonded-fluorescent compound-bonded-polymer having the solubilizable and dispersible radicals in its structure.

Examples of such solubilizable and dispersible radicals are carboxyl, sulfate, sulfo, hydroxyl, ether, carboamide, amino, imino, tertiary amino, pyridine, aliphatic hydrocarbon radicals having 2 to 18 carbon atoms, aromatic cyclic hydrocarbon radicals and the like.

Examples of the last mentioned compounds to be reacted with the chromogen-bonded-fluorescent compound-bonded-polymers are as follows: Chloroacetic acid, sodium bisulfite, sulfamic acid, ethylene oxide, methanol, ethanol, propanol, glycidol, glycerin, ammonia, methylamine, ethylamine, butylamine, dimethylamine, diethyl amine, dibutylamine, ethylenediamine, propylene diamine, hexamethylene diamine, diethylenetriamine, dipropylenetriamine, alkali, acid, stearylamine, butanol, octyl alcohol, stearic acid, plamitic acid, oleic acid, stearyl amide, N-methylol stearylamide and the like.

The chromogen-bonded-fluorescent compound-bonded-polymers produced according to the invention, can be in turn or simultaneously reacted with both the compound which provides reactive functional radicals for the polymer during the reaction and the above compounds which vide solubilizable and dispersible radicals for the polymer during the reaction.

The following examples will serve to illustrate the invention. However, it is to be understood that it is not intended to limit the scope of the invention thereto. The word "parts" appearing in the examples is intended to signify parts by weight.

EXAMPLE 1

A quantity of 3.7 parts of cyanuric chloride was dissolved in 20 parts of acetone and were added dropwise into and suspended in 60 parts of water at a temperature of 0° C. 37 parts of a 10% aqueous solution of diaminostilbene disulfonic acid were further gradually added dropwise over a period of 30 minutes at a 0 to 3° C. temperature in order to be condensed. The hydrochloric acid produced thereby was neutralized with a 5% aqueous solution of sodium carbonate. The reaction solution was maintained weakly acid. After the dropwise additions were completed, the solution was stirred for 1 hour and was then precisely neutralized. Then, 3.5 parts of 3.5-dichloro-1.4-phenylenediamine were dissolved in 30 parts of acetone, and the obtained solution was added to it dropwise. The hydrochloric acid produced in the latter step was gradually neutralized with a 5% aqueous solution of sodium carbonate. The reaction temperature was maintained at 3 to 12° C. and the reaction was continued for about 3 hours. Then, the temperature was gradually raised to 40° C. and 2.5 parts of monoethanolamine were added and made to react at 75° C. for 4 hours. After 2 hours, 21.6 parts of 5% aqueous solution of sodium carbonate were added dropwise over a period of 2 hours and the resulting produced hydrochloric acid was neutralized. Then 600 parts of water were added, the solution was heated up to 85° C. and was then filtered. The filtrate obtained thereby was cooled at 10° C., was salted out by the adding thereto of 60 parts of sodium chloride, and was then filtered. After the filter cake was washed with 15% aqueous solution of sodium chloride and dried thereafter, 9.2 parts of the product having the following structural formula were obtained.

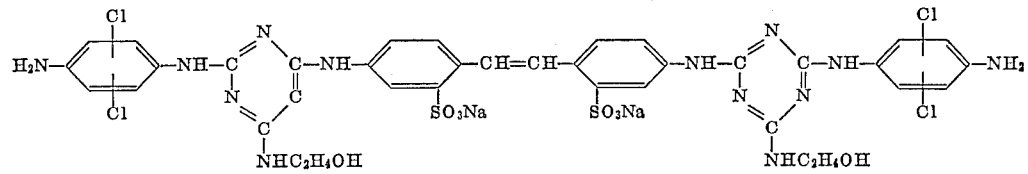

A quantity of 30 parts of 35% aqueous solution of hydrochloric acid and 100 parts of water were added to the product. The resulting mixture was well deflocculated with stirring and was then cooled to a temperature of 0 to 2° C. by the further addition thereto of 100 parts of ice. A quantity of 1.3 parts of sodium nitrite was dissolved in 20 parts of water and the solution obtained thereby was added dropwise to the above mixture. The mixture was then diazotized for 10 minutes whereby a solution of a diazonium salt of a fluorescent compound was obtained.

A quantity of 15 parts of a 35% aqueous solution of hydrochloric acid and 150 parts of ice water were added to 5 parts in pigment purity of a paste of triamino copper phthalocyanine blue. A quantity of 1.5 parts of sodium nitrite was dissolved in 20 parts of water and were added dropwise into the pigment paste-hydrochloric acid mixture at a temperature of 0 to 5° C. When the mixture was thus diazotized for 15 minutes and then filtered, an aqueous solution of diazotized copper phthalocyanine blue was obtained. A quantity of 20 parts of a solution of the diazonium salt of the fluorescent compound obtained above was mixed with the aqueous solution of diazotized copper phthalocyanine blue. To the thus obtained mixture, 15 parts of acrylamide and 5 parts of methyl acrylate were added. The resulting solution was heated to 55° C. and a polymerization was carried out for about 2 hours. The obtained polymerization solution was poured into 600 parts of methanol to effect precipitation and the precipitate was filtered. The filter cake was added to 150 parts of water and the pH of the aqueous filter cake solution was adjusted to 9 to 9.5 with an aqueous solution of sodium carbonate. When the resulting pH adjusted solution was methylolated at 60° C. for 30 minutes by the adding thereto of 30 parts of formalin, a clear blue chromogen-bonded-fluorescent compound-bonded-polymer solution was obtained. This latter solution was diluted to 1% with water and 1.2 parts of 50% aqueous solution of ammonium citrate were added as a curing catalyst to 100 parts of the diluted solution. When a polyester-cotton mixed cloth was dipped in the diluted solution, dried in open air, and then cured at 140° C. for 5 minutes, a fluorescent bright blue plain dyed cloth was obtained.

EXAMPLE 2

Instead of using triamino copper phthalocyanine blue as described in Example 1, 8 parts of an azo pigment having the following structural formula

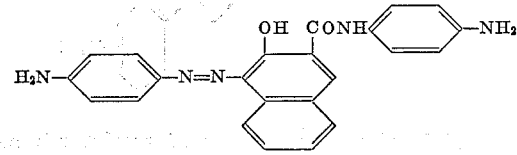

were used, and 25 parts of a 35% aqueous solution of hydrochloric acid and 150 parts of ice water were added thereto 2.9 parts of sodium nitrite were dissolved in 20 parts of water and the resulting sodium nitrite solution was added dropwise to the above-mentioned azo pigment-hydrochloric acid mixture at a temperature of 0 to 5° C. The resulting mixture was diazotized for 15 minutes, and then filtered to obtain an aqueous solution of a diazonium salt of the above-mentioned azo pigment.

Such diazonium salt solution was mixed with the solution of the diazonium salt of the fluorescent compound prepared according to the method described in Example 1. 30 parts of acrylamide and 10 parts of methyl acrylate were added to the resulting solution mixture.

A polymerization, a precipitation in methanol, a filtration and a methylolation were carried out according to the method described in Example 1 whereby there was obtained a solution of a clear red chromogen-bonded-fluorescent compound-bonded-polymer. This polymer solution could be utilized for a coloring cloth, paper, wood, metal plate, leather and the like.

EXAMPLE 3

Instead of using triamino copper phthalocyanime blue as described in Example 1, 7 parts of an azo pigment having the following structural formula

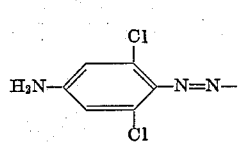 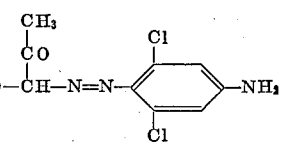

were used, and 25 parts of a 35% aqueous solution of hydrochloric acid and 150 parts of ice water added thereto 1.38 parts of sodium nitrite were dissolved in 10 parts of water and the obtained aqueous sodium nitrite solution was added dropwise to the above-mentioned azo pigment-hydrochloric acid mixture at a temperature of 0 to 5° C. The resulting mixture was diazotized for 15 minutes and then filtered to obtain an aqueous solution of a diazonium salt of the above-mentioned pigment.

The solution of diazonium salt of the pigment was mixed with the solution of the fluorescent compound prepared according to the method described in Example 1.

EXAMPLE 4

A quantity of 100 parts of an aqueous mixture containing 1.6 parts of copper phthalocyanine tetra-diazonium chloride, 0.2 part of a diazonium salt of a fluorescent pigment having the following structural formula

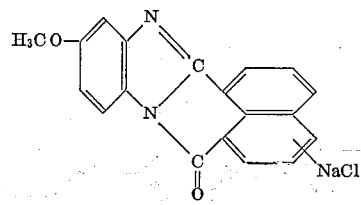

6 parts of acrylamide, 1 part of methyl acrylate, 0.5 part of glycidyl methacrylate and 0.1 part of polyethyleneglycol alkylether was charged in a polymerization vessel.

A polymerization was thereafter carried out at 50° C. for about 2 hours and then at 65° C. for about 2 hours. After the polymerization, 600 parts of methanol were added to the reaction mixture to precipitate the chromogen-bonded-fluorescent compound-bonded-polymer. The precipitate was filtered, washed with methanol, and dried in open air.

EXAMPLE 5

A quantity of 100 parts of an aqueous mixture containing 1.6 parts of perylene vermilion tetrazonium chloride, 0.2 part of a diazonium salt of a fluorescent dye having the following structural formula

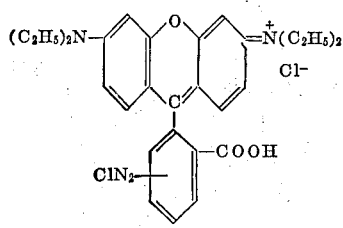

6 parts of methacrylamide, 1 part of methacrylic acid, 0.5 part of glycidyl methacrylate and 0.1 part of polyethyleneglycol alkyl ether was charged in a polymerization vessel and a polymerization was carried out according to the method described in Example 4.

After the polymerization, 500 parts of methanol were added to precipitate the chromogen-bonded-fluorescent compound-bonded-polymer. The precipitate was filtered, washed with methanol and dried in open air.

EXAMPLE 6

A quantity of 100 parts of an aqueous mixture containing 1.6 parts of 2.4.6-tris-[4-diazonium chloride anthraquinonyl-(1)amino]-s-triazine, 0.2 part of diazonium salt of a fluorescent pigment having the following structural formula

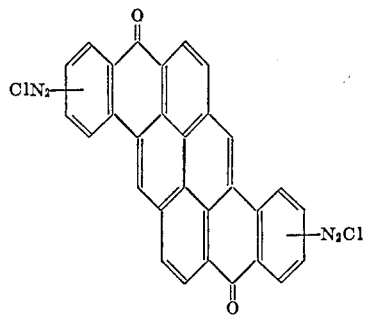

5 parts of acrylamide, 1.2 parts of acrylic acid and 1 part of γ-chloro-β-hydroxy-n-propyl acrylate was charged in a polymerization vessel and a polymerization was carried out according to the method described in Example 4.

After the polymerization, 500 parts of methanol were added to precipitate the chromogen-bonded-fluorescent compound-bonded-polymer. The precipitate was filtered and washed with methanol.

EXAMPLE 7

A quantity of 100 parts of an aqueous mixture containing 1.6 parts of 2.4.6-tris[(5-diazonium chloride-benzamido)-anthraquinonyl (1) amino]-s-triazine, 0.2 part of a diazonium salt of a fluorescent pigment having the following structural formula

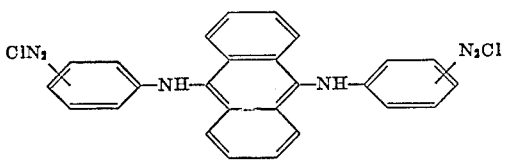

7 parts of glycidyl methacrylate and 1 part of polyethyleneglycol alkylether was charged in a polymerization vessel and a polymerization was carried out according to the method described in Example 4.

After the polymerization, 300 parts of methanol were added to precipitate the chromogen-bonded-fluorescent compound-bonded-polymer. The precipitate was filtered, washed with water and methanol and dried in open air.

EXAMPLE 8

A quantity of 100 parts of an aqueous mixture containing 1.6 parts of Vat Orange GR tri-diazonium chloride, 0.2 part of a diazonium salt of a fluorescent pigment having the following structural formula

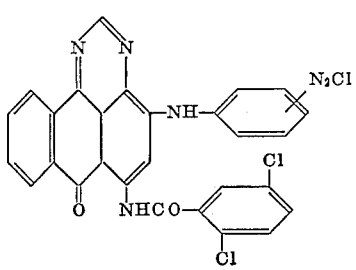

7 parts of methyl methacrylate, 1 part of glycidyl methacrylate and 0.5 part of polyethyleneglycol alkylether was charged in a polymerization vessel and a polymerization was carried out at 50° C. for 1 hour and then at 65° C. for 3 hours.

After the polymerization, 400 parts of methanol were added to precipitate the chromogen-bonded-fluorescent compound-bonded-polymer. The precipitate was filtered, washed with methanol and dried in open air.

EXAMPLE 9

A quantity of 100 parts of an aqueous mixture containing 1.6 parts of copper phthalocyanine tri-diazonium chloride, 0.2 part of a diazonium salt of a fluorescent pigment having the following structural formula

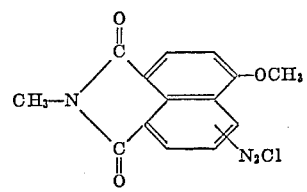

5 parts of methyl methacrylate, 2 parts of ethyl acrylate, 1 part of glycidyl acrylate and 0.4 part of polyethyleneglycol alkylether was charged in a polymerization vessel and a polymerization was carried out according to the method described in Example 4.

After the polymerization, 300 parts of methanol were added to precipitate the chromogen-bonded-fluorescent compound-bonded-polymer. The precipitate was filtered, washed with methanol and dried in open air.

EXAMPLE 10

A quantity of 100 parts of an aqueous mixture containing 1.6 parts of 2.4.6-tris 4-(diazonium chloride-benzamido)-anthraquinonyl (1) amino-s-triazine, 0.2 part of a diazonium salt of a fluorescent pigment having the following structural formula

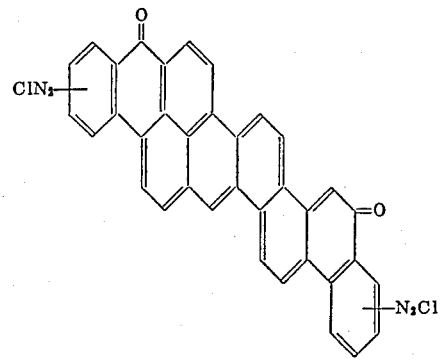

6 parts of butyl acrylate, 1 part of acrylonitrile and 0.5 part of 4.6-bis(N-butylmethylolamino)-2-vinyl-s-triazine was charged in a polymerization vessel and a polymerization was carried out according to the method described in Example 4.

After the polymerization, the precipitated chromogen-bonded-fluorescent compound-bonded-polymer was filtered and washed with water and methanol.

EXAMPLE 11

A quantity of 100 parts of an aqueous mixture containing 1.6 parts of copper phthalocyanine blue tri-diazonium chloride, 0.2 part of a diazonium salt of fluorescent dye having the following structural formula

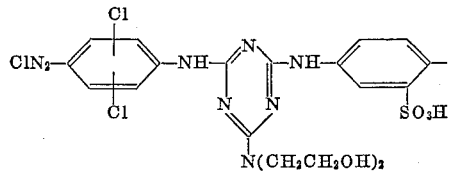 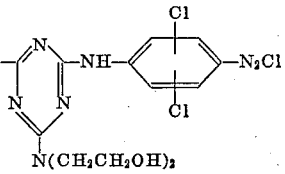

7 parts of acrylic acid was charged in a polymerization vessel and a polymerization was carried out according to the method described in Example 1.

After polymerization, the pH was adjusted to 9.0 and 500 parts of acetone were added to the reaction mixture to precipitate the chromogen-bonded-fluorescent compound-bonded-polymer. The precipitate was filtered, washed with acetone and dried in open air.

EXAMPLE 12

A quantity of 100 parts of an aqueous mixture containing 1.6 parts of copper phthalocyanine blue tetra-diazonium chloride, 0.2 part of a diazonium salt of a fluorescent pigment having the following structural formula

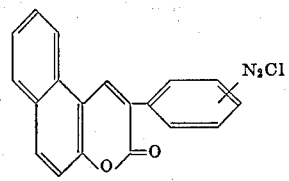

5 parts of acrylamide and 2 parts of itaconic amide was charged in a polymerization vessel and a polymerization was carried out according to the method described in Example 4.

After the polymerization, 600 parts of methanol were added to the reaction mixture to precipitate the chromogen-bonded-fluorescent compound-bonded-polymer. The precipitate was filtered, washed with acetone and dried in open air.

EXAMPLE 13

A quantity of 100 parts of an aqueous mixture containing 1.6 parts of carbazole dioxazine violet tri-diazonium salt, 0.2 part of a diazonium salt of a fluorescent pigment having the following structural formula

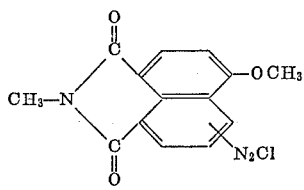

5 parts of methacrylic acid and 2 parts of ethyleneglycol monoacylate was charged in a polymerization vessel, and a polymerization was carried out according to the method described in Example 1.

After the polymerization, the pH was adjusted to 9 to obtain the solution of the chromogen-bonded-fluorescent compound-bonded-polymer and the solution was filtered.

EXAMPLE 14

A quantity of 100 parts of an aqueous mixture containing 1.6 parts of a diazonium salt of an azo dye having the following structural formula

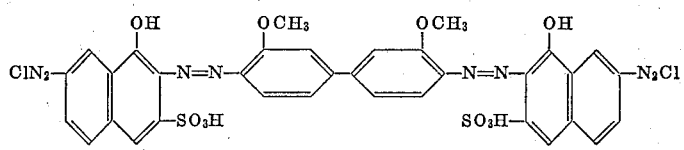

0.2 part of a diazonium salt of a fluorescent pigment having the following structural formula

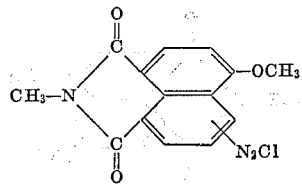

3 parts of acrylic acid and 2 parts of methyl acrylate was charged in a polymerization vessel and a polymerization was carried out according to the method described in Example 4.

After the polymerization, the pH was adjusted to 9.0 and 600 parts of acetone were added to the reaction mixture to precipitate the chromogen-bonded-fluorescent compound-bonded-polymer. The precipitate was filtered, washed with acetone, and dried in open air.

EXAMPLE 15

A quantity of 100 parts of an aqueous mixture containing 1.6 parts of copper phthalocyanine blue tri-diazonium chloride, 0.2 part of a diazonium salt of a fluorescent pigment having the following structural formula 4 parts of N.N-dimethylaminoethylmethacrylate and 3 parts of methyl acrylate were charged in a polymerization vessel and a polymerization was carried out according to the method described in Example 1.

After the polymerization, the pH was adjusted to 10 to precipitate the chromogen-bonded-fluorescent compound-bonded-polymer. The precipitate was filtered and washed with a dilute solution of sodium carbonate.

EXAMPLE 16

A quantity of 100 parts of an aqueous mixture containing 1.6 parts of flavanthrone yellow tri-diazonium chloride, 0.2 part of a diazonium salt of a fluorescent pigment having the following structural formula

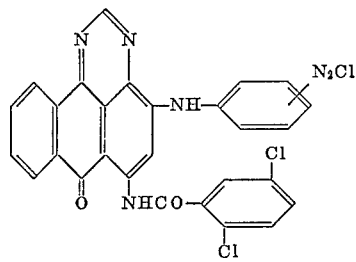

9 parts of methyl methacrylate and 0.5 part of triethanolamine alkylbenzene sulfonate was charged in a polymerization vessel and a polymerization was carried out according to the method described in Example 4.

After the polymerization, 200 parts of methanol were added to precipitate the chromogen-bonded-fluorescent compound-bonded-polymer. The precipitate was filtered, washed with water and methanol, and dried in open air.

EXAMPLE 17

A quantity of 100 parts of an aqueous mixture containing 0.8 part of quinacridone di-diazonium chloride, 0.8 part of a diazonium salt of a fluorescent pigment having the following structural formula

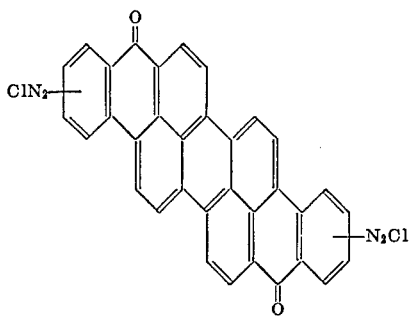

8 parts of ethyl acrylate and 1 part of acrylonitrile was charged in a polymerization vessel and a polymerization was carried out according to the method described in Example 4.

After the polymerization, the precipitated chromogen-bonded-fluorescent compound-bonded-polymer was filtered, washed with methanol and dried in open air.

EXAMPLE 18

A quantity of 100 parts of an aqueous mixture containing 1.5 parts of copper phthalocyanine blue tri-diazonium chloride, 0.2 part of a diazonium salt of a fluorescent pigment having the following structural formula

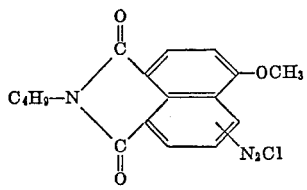

7 parts of acrylonitrile, 3 parts of ethyl acrylate and 1 part of triethanolamine alkylbenzene sulfonate was charged in a polymerization vessel and a polymerization was carried out according to the method described in Example 4. After the polymerization, 300 parts of methanol were added to the reaction mixture to precipitate the chromogen-bonded-fluorescent compound-bonded-polymer. The precipitate was filtered, washed with water and methanol, and dried in open air.

EXAMPLE 19

A quantity of 5 parts of the methylolated chromogen-bonded-fluorescent compound-bonded-polymer prepared according to the method described in Example 1 was dissolved in 95 parts of water, 50 parts of a 10% aqueous solution of sodium bisulfite were added to this solution and its pH was adjusted to 10 with a 5% aqueous solution of sodium carbonate.

A sulfonation reaction was carried out at 60° C. for 3 hours. After filtration 2 parts of sodium chloride and 500 parts of methanol were added to the filtrate to precipitate the chromogen-bonded-fluorescent compound-bonded-polymer. The precipitate was filtered, washed with 10 parts of acetone and dried in open air.

EXAMPLE 20

A quantity of 5 parts of the chromogen-bonded-fluorescent compound-bonded-polymer prepared according to the method described in Example 7 was dissolved in 95 parts of ethylene-glycol monoethylether monoacetate. Then, 13 parts of a 20% ethyleneglycol monoethylether monoacetate solution of diethylamine were added dropwise to the above solution at 50° C. for 1 hour.

After stirring the above solution for 2 hours at 65° C. it was cooled to 15° C. and poured into 5,000 parts of a 0.5% aqueous solution of sodium hydroxide to precipitate the chromogen-bonded-fluorescent compound-bonded-polymer. The precipitate was filtered and washed with 20 parts of water, and then dried in open air.

EXAMPLE 21

A quantity of 5 parts of the chromogen-bonded-fluorescent compound-bonded-polymer prepared according to the method described in Example 17 was dissolved in 95 parts of benzene. Then, 80 parts of a 5% ethanol solution of potassium hydroxide were added to the above solution. A hydrolysis reaction was carried out at 75° C. for 12 hours. After reaction, the precipitated chromogen-bonded-fluorescent compound - bonded - polymer was filtered, washed with 50 parts of ethanol and dried in open air.

What is claimed is:

1. A method of making a chromogen-bonded-fluorescent compound-bonded-polymer which comprises (1) mixing (a) at least one species of an ethylenically unsaturated polymerizable monomer selected from the group consisting of a first group which are capable of crosslinking to form a higher polymer and capable of crosslinking with a functional radical, consisting of N-methylolacrylamide, N-methylolmethacrylamide, 4,6-bis-(N-butylmethylolamino)-2-vinyl - s - triazine, glycidylacrylate, glycidylmethacrylate, γ - chloro-β-hydroxy-n-propyl-acrylate and γ-chloro-β-hydroxy-n-propyl-methacrylate, a second group which are capable of crosslinking with a reactive functional radical but which are incapable of crosslinking with themselves under ordinary curing-condition, consisting of acrylic acid, methacrylic acid, acrylamide, methacrylamide, itaconic amide, 2-hydroxyethylacrylate and 2 - hydroxyethylmethacrylate, and a third group which are difficultly activated with reactive functional radical, consisting of methyl, ethyl, propyl and butyl esters of acrylic acid, and methacrylic acid, acrylonitrile, methacrylonitrile and N,N'-dimethylaminoethyl ester of acrylic acid and methacrylic acid with (b) at least one species of a diazonium salt of a chromogen selected from the group consisting of diazonium salts of copper, cobalt and nickel phthalocyanine pigment, s-triazinylamino anthraquinone pigment, anthrapyrimidine pigment, perinone pigment, quinacridone pigment, carbazole dioxazine pigment, and azo coupling pigment and (c) at least one species of a diazonium salt of a fluorescent compound derived from the fluorescent compound selected from the group consisting of diazonium salts of fluorescent compounds of the types of diaminostilbene, coumarin, naphthalimide, anilino anthracene, and triphenylmethane and (2) polymerizing said monomer using said diazonium compounds as an initiator for the polymerization of said monomer to form said chromogen-bonded-fluorescent compound - bonded-polymer.

2. A method as defined in claim 1 and further including the steps of reacting the chromogen-bonded-fluorescent compound-bonded-polymer with a material selected from the group consisting of formaldehydes, di-, tri- and tetra-methylol urea, di-, tri-, tetra-, penta- and hexa-methylolmelamine, methyl, ethyl, propyl and butyl esters of di-, tri-, tetra-, penta-, and hexa-methylolmelamine, epichlorohydrine, dichlorohydrine and ethyleneimine to produce said chromogen-bonded-fluorescent compound-bonded-polymer having corresponding reactive functional radicals selected from the group consisting of N-methylol amide, N-methylmethylol amide, N-ethylmethylol amide, N-butylmethylol amide, epoxy, $\gamma$-chloro-$\beta$-hydroxy-$\eta$-propyl and ethylene imide radicals in its structure.

3. A method as defined in claim 1 and further including the steps of reacting said chromogen-bonded-fluorescent compound-bonded-polymer with a material selected from the group consisting of chloroacetic acid, sodium disulfite, sulfamic acid, ethyleneoxide, methanol, ethanol, propasol, glycidol, methylamine, ethylamine, butylamine, dimethylamine, diethylamine, dibutylamine, ethylenediamine, propylene diamine, hexamethylene - diamine, diethylene-triamine, dipropylenetriamine, stearylamine, butanol, octyl-alcohol, stearic acid, palmitic acid, and oleic acid to produce the chromogen-bonded-fluorescent compound-bonded-polymer having corresponding solubilizing and dispersing radicals selected from the group consisting of carboxy, sulfate, sulfo, hydroxyl ether, amino, imino, tertiary amino and aliphatic hydrocarbon radicals having 2 to 18 carbon atoms in its structure.

4. A method as defined in claim 1 and further including the steps of reacting the chromogen-bonded-fluorescent compound-bonded-polymer with a material selected from the group consisting of formaldehyde, di-, tri-, and tetra-methylol urea, di-, tri-, tetra-, penta- and hexa-methylol melamine, methyl, ethyl, propyl and butyl ethers of di-, tri-, tetra-, penta- and hexa-methylolmelamine, epichlorohydrin, dichlorohydrin, and ethyleneimine to produce the chromogen-bonded-fluorescent compound-bonded-polymer having corresponding reactive functional radicals selected from the group consisting of N-methylol amide, N-methyl methylol amide, N-ethyl-methylol amide, N-butyl methylol amide, epoxy, $\gamma$-chloro-$\beta$-hydroxy-n-propyl, and ethylene amide radicals in its structure and reacting said last named polymer with a material selected from the group consisting of chloroacetic acid, sodium bisulfite, sulfamic acid, ethylene oxide, methanol, ethanol, propanol, glycidol, methylamine, ethylamine, butylamine, dimethylamine, diethylamine, dibutylamine, ethylenediamine, propylenediamine hexamethylenediamine, diethylenetriamine, dipropylenetriamine, stearlyamine, butanol, octyl-alcohol, stearic acid, palmitic acid and oleic acid to form a chromogen-bonded-fluorescent compound-bonded-polymer containing corresponding reactive functional radicals and corresponding solubilizable and dispersible radicals.

5. The chromogen-bonded-fluorescent compound-bonded-polymer produced by the method of claim 1.

6. A method as defined in claim 1 wherein said diazonium salt of a chromogen is selected from the group consisting of: copper phthalocyanine tetra-diazonium salt, monochloro copper phthalocyanine tri-diazonium salt, copper phthalocyanine tri-diazonium salt, cobalt phthalocyanine tri-diazonium salt, nickel phthalocyanine tri-diazonium salt, anthrapyrimidine tetrazonium salt, flavanthrone tri-diazonium salt, perylene vermilion tetrazonium salt, perylene scarlet diazonium salt, phthaloperinone tetrazonium salt, quinacridone tetrazonium salt, dichloro quinacridone tetrazonium salt, carbazole dioxazine tri-diazonium salt, Vat Orange GR tetrazonium salt, 2.6-bis-[4 - (diazonium salt) - anthroquinonyl - (1) - amino] - 4-[p-(diazonium salt)-phenoxy]-s-triazine, 2.4.6-tris 4-(di-azonium salt) - anthraquinonyl-(1)-amino] - s - triazine, 2.4.6 - tris - {4 - [p - (diazonium salt) - benzamido] - anthraquinonyl - (1) - amino} - s - triazine, 2.4.6 - tris - {5-[p -.(diazonium salt) - benzamido] -anthraquinonyl - (1) - amino}-s-triazine, indigo tetrazonium salt, dichloro thioindigo tetrazonium salt, tetra-methyldichloro thioindigo tetrazonium salt, 7.7'-dimethyl-4.4'-dichloro thioindigo-5.5'-tetrazonium salt, 7.7'-dimethyl-5.5'-dichloro thioindigo-4.4'-tetrazonium salt, 7.6'-dichloro-4'.7'-dimethyl thioindigo-5.5'-tetrazonium salt, 3.5 - dichloro-4-(diazonium salt) benzene-azo-$\beta$-naphthol, 3.5-dichloro-4-(diazonium salt) - benzene - azo - 2 - hydroxy - 3 - naphthoic - 4' - (diazonium salt)anilide, 2-methoxy-5-benzoylamino benzene-azo-2-hydroxy-3-naphthoic - 4' - (diazonium salt)anilide, 3.5 - dichloro - 4 - (diazonium salt)benzene - azo - 2 - hydroxy-3-naphthoic-3'-(diazonium salt)-anilide, 3-trifluoromethyl - 4 - chlorobenzene - azo - 2 - hydroxy - 3 - naphthoic-3'-(diazonium salt)-anilide, 2.5-diethoxy-4-benzoylaminobenzene - azo - 2 - hydroxy - 3 - naphthoic - 3' - (diazonium salt)anilide, 3.3' - dimethoxydiphenyl-disazo-bis-4-(diazonium salt)naphthalene, diphenyl-disazo-bis-3'(diazonium salt)-acetoacetic anilide, bis-[3.5-dichloro-4-(diazonium salt)benzene-azo-acetacetic-0-toluidide] and bis-[3.5 - dichloro - 4 - (diazonium salt) - benzene - azo - 2-hydroxy-3-naphthoic-0-chloro anilide].

7. A method as defined in claim 1 wherein said diazonium salt of a fluorescent compound is selected from the group consisting of 4,4-di-(2-ethanolamino-4-dichlorophenylamino - triazinyl - 6-amino)-stilbene-2,2'-disulfonic acid tetrazonium salt, 4-methoxy-naphthalic acid-n-methylimide diazonium salt, 4-methoxy-naphthalic acid-n-butylimide diazonium salt, 3-phenyl-5,6-benzo-coumarine diazonium salt, 9,10-dianilinoanthracene tetrazonium salt and tetraethyldiamino - (o - carboxyphenyl) - xanthylium chloride diazonium salt.

References Cited

UNITED STATES PATENTS

| | | | |
|---|---|---|---|
| 1,500,844 | 7/1924 | Plauson | 260—144 |
| 2,994,693 | 8/1961 | Blake et al. | 260—144 |
| 3,232,691 | 2/1966 | Wilhelm et al. | 260—144 |
| 3,278,486 | 10/1966 | Meek et al. | 260—202 XR |

OTHER REFERENCES

Lange et al., C.A., vol. 58, p. 14233a (1963) QDI.A51.

FLOYD D. HIGEL, Primary Examiner

U.S. Cl. X.R.

8—3, 47, 12, 13, 41, 62, 71; 106—288; 117—124, 127, 138.8, 142, 152; 252—89, 132, 426; 260—37, 41, 144, 249,6, 874, 881, 883, 885, 999